UNITED STATES PATENT OFFICE.

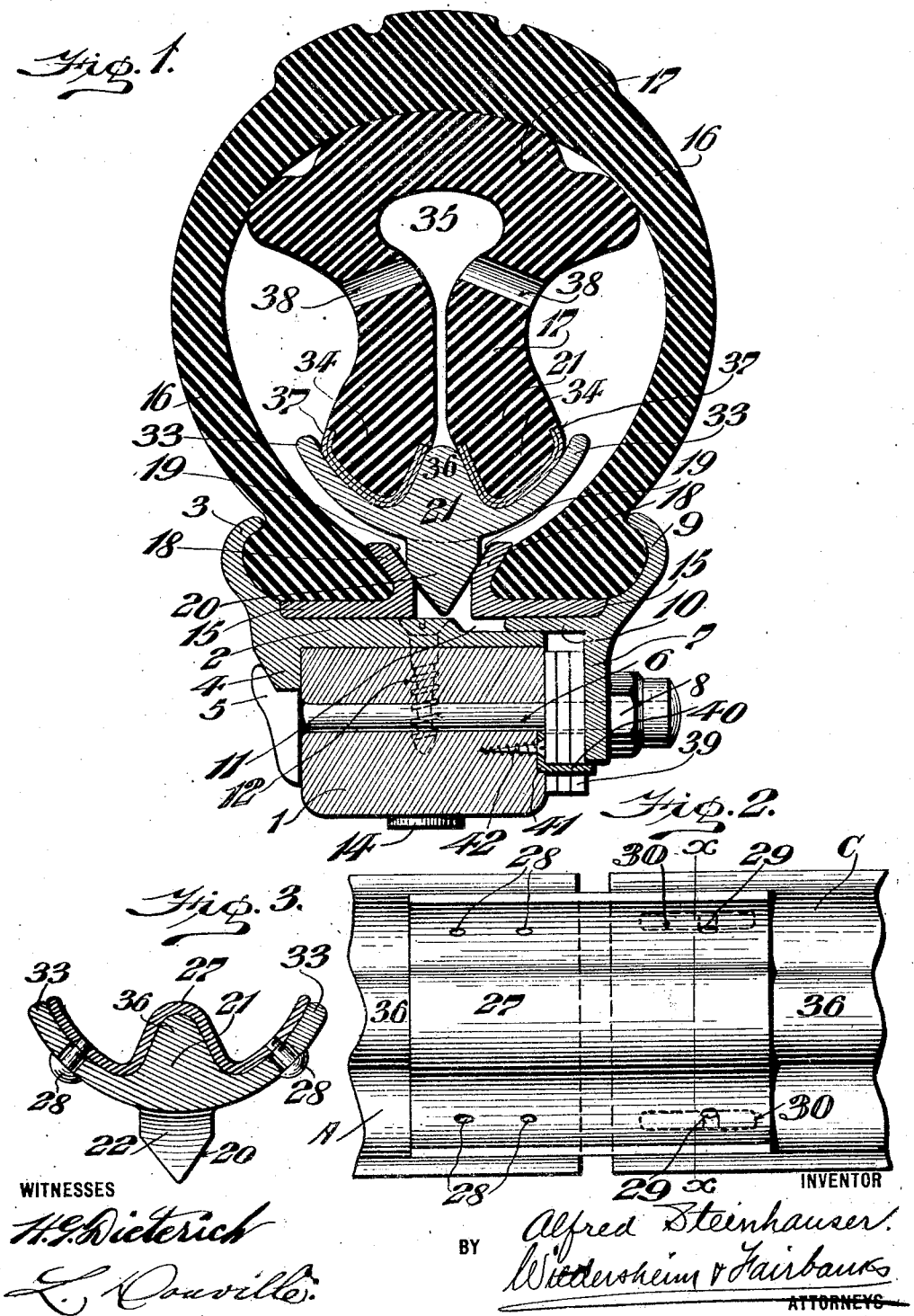

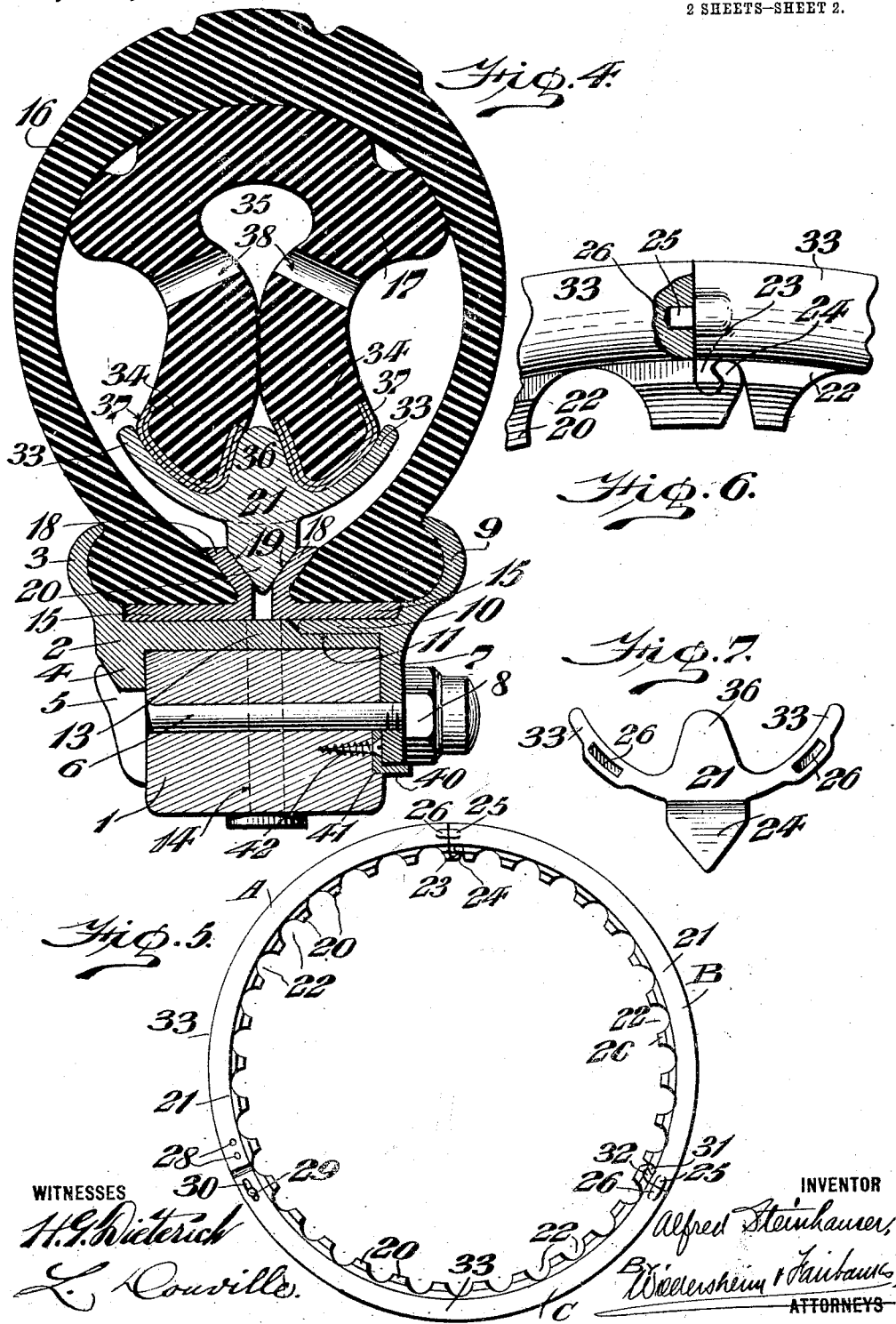

ALFRED STEINHAUSER, OF PHILADELPHIA, PENNSYLVANIA.

VEHICLE-TIRE.

1,049,937.   Specification of Letters Patent.   Patented Jan. 7, 1913.

Application filed March 7, 1912. Serial No. 682,283.

*To all whom it may concern:*

Be it known that I, ALFRED STEINHAUSER, a citizen of the United States, residing in the city and county of Philadelphia, State of Pennsylvania, have invented a new and useful Vehicle-Tire, of which the following is a specification.

This invention relates to vehicle tires and more particularly to an elastic or cushion tire and has for an object to provide a resilient structure adapted to carry a motor vehicle or the like, absorb and distribute the shocks due to irregularities in the road and which is also non-deflatable and puncture-proof.

It has for a further object to provide a tire in which the outer casing is substantially of the same type as used in tires as at present constructed and embodying as an element a cushioning member which is so arranged and supported as to be out of contact with the inner wall of the outer casing adjacent the clencher element, thereby directing the compressive action to the felly and eliminating wear and pinching of the outer casing.

It has for a further object to provide a novel form of cushioning element which is designed to take up and distribute the strains due to compression and concentrate the applied forces directly upon the felly and its adjuncts thus relieving the outer casing of a material part of the load.

It further consists of other novel features of construction, all as will be hereinafter fully set forth.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a transverse section of a tire, embodying my invention, mounted upon a felly and shown in one operative position. Fig. 2 represents a plan of a portion of the supporting ring for the cushioning element, showing a joint closing device. Fig. 3 represents a section on line $x$—$x$ Fig. 2. Fig. 4 represents a transverse section similar to Fig. 1 but showing the parts in another operative position. Fig. 5 represents a side elevation of the supporting ring. Fig. 6 represents a detail showing one of the joints of the supporting ring. Fig. 7 represents a detail of the end of one of the ring sections.

Similar numerals of reference indicate corresponding parts in the figures.

Referring to the drawings, 1 designates the felly, preferably of wood, of a vehicle wheel used in connection with motor vehicles or the like and to which is secured, in the present instance, a rim member 2 provided with the customary clencher lip 3 and also having a depending flange 4 adapted to seat against the side of a felly 1 and held in such position by means of a suitably shaped bolt head 5 of the fastening bolt 6 which passes transversely through the felly 1 and through a clamping ring 7 and holds the parts in adjusted position by means of the nut 8. The clamping ring 7 is likewise provided with a clencher lip 9 and also carries an inwardly disposed annular flange 10 which in normal position is seated in the cut away portion 11 of the rim 2.

The rim member 2 is fixedly secured to the felly 1 by means of screws 12 or like fastening means which are disposed at suitable intervals about the circumference thereof for the desired purpose and it will also be noted that apertures 13 are formed in the rim 2 at suitable spaced distances and aline with openings 14 which are radially bored through the felly 1 and serve as air passages communicating with the interior of the tire structure. In connection with the fastening devices just described, it will of course be understood that the rim member 2 is of annular form and that there are a plurality of the fastening bolts 6 spaced apart and located at suitable points.

15 designates a pair of annular plates seated respectively on the rim 2 and flange 10 of the ring 7 and serving the double function of a seat for the outer shoe 16 and as a means to place the inner cushioning element 17 under compression through the medium of certain devices presently to be described. Each of the plates 15 is provided with a circumferential flange 18 positioned in juxtaposed relation to each other and having a portion thereof angularly disposed to form a beveled face 19 adapted to coöperate with and move the annular wedge block 20 of the supporting ring 21.

The ring 21 is preferably formed in sections as shown in Fig. 5 and, in the present instance, it is divided into three sections which for the purpose of illustration, I have lettered A, B and C. By reference to Fig. 5, it will be seen that the annular block 20 is cut away at suitable intervals to form transverse openings 22 which not only reduces the weight of the ring 21 but also permits a greater degree of flexibility. The section A of the ring 21 joins the adjacent section B by means of the interlocking hooks 23 and 24 and as a further means of accurately fitting the sections together, I preferably provide projecting tongues 25 for engagement with suitable openings or grooves 26, whereby the joint is strengthened by this dowel construction. The opposite end of the section A joins the section C, as here shown, by a sliding or expansion connection comprising the cap plate 27 which is secured by rivets 28, or like fastening devices, to the section A of the ring 21 and preferably projects a suitable distance beyond the end thereof to allow for the maximum expansion of the ring sections when in operative position. The projecting end of this plate 27, as seen in Fig. 2, extends over the section C of the ring 21 to which it is movably attached by means of the bolts 29 and longitudinally disposed slots 30 in the ring member 21, section C. It will thus be apparent that as the ring member 21 is expanded and the sections A and C are withdrawn from contacting position, the cap plate 27 will act as a shield or protector to prevent the cushioning element 17 which is supported by this ring 21 from being forced down into the opening between the sections. The sections B and C are jointed together, in the present instance, by a double hook construction 31 and 32 whereby the sections may be readily assembled or taken apart, as the case may be.

It will here be noted that the cap plate 27 preferably conforms in shape to the configuration of the upper surface of the ring member 21 and therefore attention is directed to the preferred construction of this member. Referring to Fig. 3, a transverse section of this ring 21 is shown with the cap plate 27 in position thereon and it will be seen that the ring member 21 is provided with laterally extending upwardly curved side wings 33 which serve to seat the legs 34 of the cushioning element 17 the latter, as will be seen from Fig. 1, being radially split and having an inner inclosed circumferential space 35 formed therein. Between the wings 33 the body portion of the ring 21 is outwardly extended to form a substantially V-shaped annular projection 36 which is pressed between the supporting ends of the legs 34 of the cushioning element 17 and forms an abutment to maintain the cushioning element 17 correctly seated upon the side wings 33.

Referring now to the cushioning element 17, I have preferably formed this as a substantially T-shaped annular member which is radially split for a portion of its thickness to form the legs 34 and it will be noted that that portion of the legs which contact with the side wings 33 is reinforced, in the present instance, with a double layer of fabric 37, in order to withstand any wear which may take place at this point.

38 designates apertures or passages transversely formed in each of the legs 34 and serving as a communication between the conduit 35 and the space between the cushioning element and the outer casing 16, so that the air within the outer casing may freely circulate around and through the cushioning element and by way of the openings 22 find its way to the passageways 14 through the felly 1.

Attention is directed to the fact that the cushioning element is so shaped and arranged as to contact with the outer casing only at the points where necessary to transmit the pressures directly to the supporting ring and thence to the felly 1 and it will be seen that by this construction a greater portion of the interior of the outer casing 16 is not engaged by the inner element nor does it contact with any of the parts inclosed thereby and thus is free to act as a cushioning means.

In connection with the unobstructed inner portion of the outer casing 16 it will be noted that the ring 21 is always maintained by its operating adjuncts out of contact with the outer casing and thereby does not cause wear or pinching of the said casing 16 adjacent the clencher lugs 3 and 9.

In Fig. 1, I have shown the fastening device which holds my novel tire structure to the felly in a position with a plurality of liners 39 between the clamping rings 7 and the felly 1, whereby adjustment of the parts is permitted since further tightening action may readily be made by removing one or more of the said liners until the final closed position is reached, as shown in Fig. 4. These liners 39 are of course placed at suitable points about the side of the felly 1 and are seated in apertures of an annular angle member 40, one side of which is preferably seated in a groove 41 of the felly 1 in such a manner that the outer face thereof is flush with the side of the felly and is held in such position by means of screws 42 or like fastening devices. This angle member projects laterally from the felly 1 and forms a supporting bracket for the ring 7 and prevents the latter from swinging away from the outer shoe and maintains it in normal operative position.

It will now be apparent that I have devised a complete unitary tire structure, simple in construction and designed in such a manner that it cannot collapse in case of puncture and which embodies all the resilient and shock absorbing advantages of the best type of pneumatic tire and which is furthermore calculated to relieve the wear and pressure on the outer shoe adjacent its attachment to the felly. It will furthermore be noted that the cushioning element embodied in my novel tire is so mounted and connected to the felly as to direct all pressure and strains directly to the felly and its adjuncts and in addition a substantial portion of the inclosed cushioning element is out of contact with the inner wall of the outer shoe, while its supporting ring 21 is in all operative positions held out of contact with the outer shoe and thus acts to transmit the compressive forces directly to the felly. Attention is also directed to the means for permitting the circulation of cooling air through the tire, since the same has free access through the passages 14 and openings 22 to the interior of the outer casing and may then circulate through the cushioning elements by way of the passages 38.

It will now be apparent that I have devised a novel and useful construction of a vehicle tire which embodies the features of advantage enumerated as desirable in the statement of the invention and the above description and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a vehicle tire, an outer annular shoe, an annular cushioning element within said shoe having a divided inner circumference, a transversely divided ring located between said outer shoe and the inner circumference of said cushioning element, seats on said ring spaced apart and each adapted to support a divided portion of said cushioning element, a wedge element carried by said ring, and means engaging said wedge element to always maintain said ring out of contact with said outer shoe.

2. In a vehicle tire, an outer annular shoe, an annular cushioning element within said shoe having a divided inner circumference, a transversely divided ring located between said outer shoe and the inner circumference of said cushioning element, seats on said ring spaced apart and each adapted to support a divided portion of said cushioning element, a wedge element carried by said ring, and clamping means engaging said wedge member whereby said ring maintains said cushioning element normally under compression.

3. In a vehicle tire, an outer annular shoe, an annular cushioning element within said shoe, a transversely divided ring located within said outer shoe and extending between the same and said cushioning element, a seat formed on each side of said ring for the portion of the cushioning element juxtaposed to said shoe, a wedge element carried by said ring and having a plurality of transverse openings therein, and means coöperating with said wedge element to always maintain said ring out of contact with said outer shoe.

4. In a vehicle tire, an outer annular shoe, an annular cushioning element within said shoe, a transversely divided ring extending between said outer shoe and said cushioning element and forming a seat for the portion of the cushioning element juxtaposed to said shoe, a wedge element carried by said ring, a pair of oppositely disposed plates adapted to seat on a felly, a flange angularly carried by each plate and adapted to engage said wedge element, and clamping means to move one of said plates toward the other whereby said ring is always maintained out of contact with said outer shoe.

ALFRED STEINHAUSER.

Witnesses:
 ROBERT M. BARR,
 C. D. McVAY.